United States Patent
Wan et al.

(10) Patent No.: US 10,951,090 B2
(45) Date of Patent: Mar. 16, 2021

(54) TRANSMISSION DEVICE AND AIR-COOLING ISLAND

(71) Applicant: Flender GmbH, Bocholt (DE)

(72) Inventors: Wen Ming Wan, Beijing (CN); Dong Chen, Tianjin (CN); Yi Chen You, Tianjin (CN); Jing Ran Chen, Tianjin (CN)

(73) Assignee: FLENDER GMBH, Bocholt (DE)

( * ) Notice: Subject to any disclaimer, the term of this patent is extended or adjusted under 35 U.S.C. 154(b) by 32 days.

(21) Appl. No.: 16/320,134

(22) PCT Filed: Jul. 20, 2017

(86) PCT No.: PCT/CN2017/093752
§ 371 (c)(1),
(2) Date: Jan. 24, 2019

(87) PCT Pub. No.: WO2018/019178
PCT Pub. Date: Feb. 1, 2018

(65) Prior Publication Data
US 2020/0028410 A1    Jan. 23, 2020

(30) Foreign Application Priority Data
Jul. 26, 2016 (CN) .......................... 201620819700.8

(51) Int. Cl.
*H02K 1/14* (2006.01)
*H02K 7/10* (2006.01)
(Continued)

(52) U.S. Cl.
CPC ................. *H02K 7/10* (2013.01); *H02K 5/04* (2013.01); *H02K 7/003* (2013.01)

(58) Field of Classification Search
CPC ...... H02K 5/225; H02K 7/116; H02K 7/1163; H02K 7/003; B60K 17/06
(Continued)

(56) References Cited

U.S. PATENT DOCUMENTS 2,438,545 A * 3/1948 Davidson .................. B66F 3/20
                                                    318/466
3,377,886 A * 4/1968 Frantz ....................... F16H 1/32
                                                    475/162
(Continued)

FOREIGN PATENT DOCUMENTS

CN        2225465 Y     4/1996
CN      201904685 U     7/2011
(Continued)

OTHER PUBLICATIONS

International Search Report PCT/ISA/210 for International Application No. PCT/CN2017/093752 dated Oct. 10, 2017.
(Continued)

*Primary Examiner* — Thanh Lam
(74) *Attorney, Agent, or Firm* — Harness, Dickey & Pierce, P.L.C.

(57) ABSTRACT

Provided are a transmission device and an air-cooling island. The transmission device includes: a motor comprising a motor output shaft; and a speed reducer including a speed reducer input shaft. The motor output shaft is directly connected with the speed reducer input shaft.

3 Claims, 2 Drawing Sheets

(51) Int. Cl.
H02K 5/04 (2006.01)
H02K 7/00 (2006.01)

(58) Field of Classification Search
USPC .................................. 310/40 R, 71, 75, 83
See application file for complete search history.

(56) References Cited

U.S. PATENT DOCUMENTS

| | | | | |
|---|---|---|---|---|
| 4,056,018 | A | * | 11/1977 | Chung .................... B32B 37/02 |
| | | | | 74/665 P |
| 5,382,858 | A | * | 1/1995 | Sugiyama ............... F16C 19/55 |
| | | | | 310/90 |
| 5,715,901 | A | | 2/1998 | Tokushima |
| 2005/0221941 | A1 | * | 10/2005 | Nihei ...................... B25J 9/102 |
| | | | | 475/178 |
| 2011/0207570 | A1 | * | 8/2011 | Tanaka .................... B60K 1/00 |
| | | | | 475/150 |
| 2014/0379199 | A1 | | 12/2014 | Bischoff |
| 2016/0258506 | A1 | * | 9/2016 | Deane ................... F16C 32/044 |

FOREIGN PATENT DOCUMENTS

| | | |
|---|---|---|
| CN | 201954977 U | 8/2011 |
| CN | 203382441 U | 1/2014 |
| CN | 104716777 A | 6/2015 |
| CN | 205020070 U | 2/2016 |
| CN | 205331022 U | 6/2016 |
| CN | 206060447 U | 3/2017 |
| EP | 3462264 A1 | 4/2019 |
| KR | 101273638 B1 | 6/2013 |

OTHER PUBLICATIONS

Written Opinion of the International Searching Authority PCT/ISA/237 for International Application No. PCT/CN2017/093752 dated Oct. 10, 2017.
Indian Office Action dated Apr. 29, 2020.
Extended European Search Report dated Dec. 18, 2019.
European Office Action for corresponding European Patent Application No. 17833481.9 dated Oct. 6, 2020.

* cited by examiner

TRANSMISSION DEVICE AND AIR-COOLING ISLAND

PRIORITY STATEMENT

This application is the national phase under 35 U.S.C. § 371 of PCT International Application No. PCT/CN2017/093752 which has an International filing date of Jul. 20, 2017, which designated the United States of America and which claims priority to Chinese patent application number 201620819700.8 filed Jul. 26, 2016, the entire contents of which are hereby incorporated herein by reference.

FIELD

An embodiment of invention generally relates to a transmission device, in particular to a manner of connecting a speed reducer to an electric machine, especially a transmission device for an air-cooling island.

BACKGROUND

In power plant air-cooling island applications, it is necessary to use an electric machine to drive a speed reducer, and in turn drive fan blades via the speed reducer to achieve steam cooling. An electric machine output shaft and a speed reducer input shaft are generally linked via a shaft coupling, hence a large additional electric machine mounting flange is needed to support the electric machine. Such a manner of mounting places high requirements on space, and costs are also relatively high.

SUMMARY

At least one embodiment of the present application is directed to providing a transmission device, comprising:
an electric machine, wherein the electric machine comprises an electric machine output shaft; and
a speed reducer, comprising a speed reducer input shaft;
wherein the electric machine output shaft is directly connected to the speed reducer input shaft.

At least one embodiment of the present application is directed to providing an air-cooling island, comprising the transmission device as described in any one of the embodiments.

BRIEF DESCRIPTION OF THE DRAWINGS

The accompanying drawings below are merely intended to illustrate and explain the present application schematically, and do not limit the scope thereof. In the drawings.

LIST OF LABELS USED IN THE DRAWINGS

Figure 1:
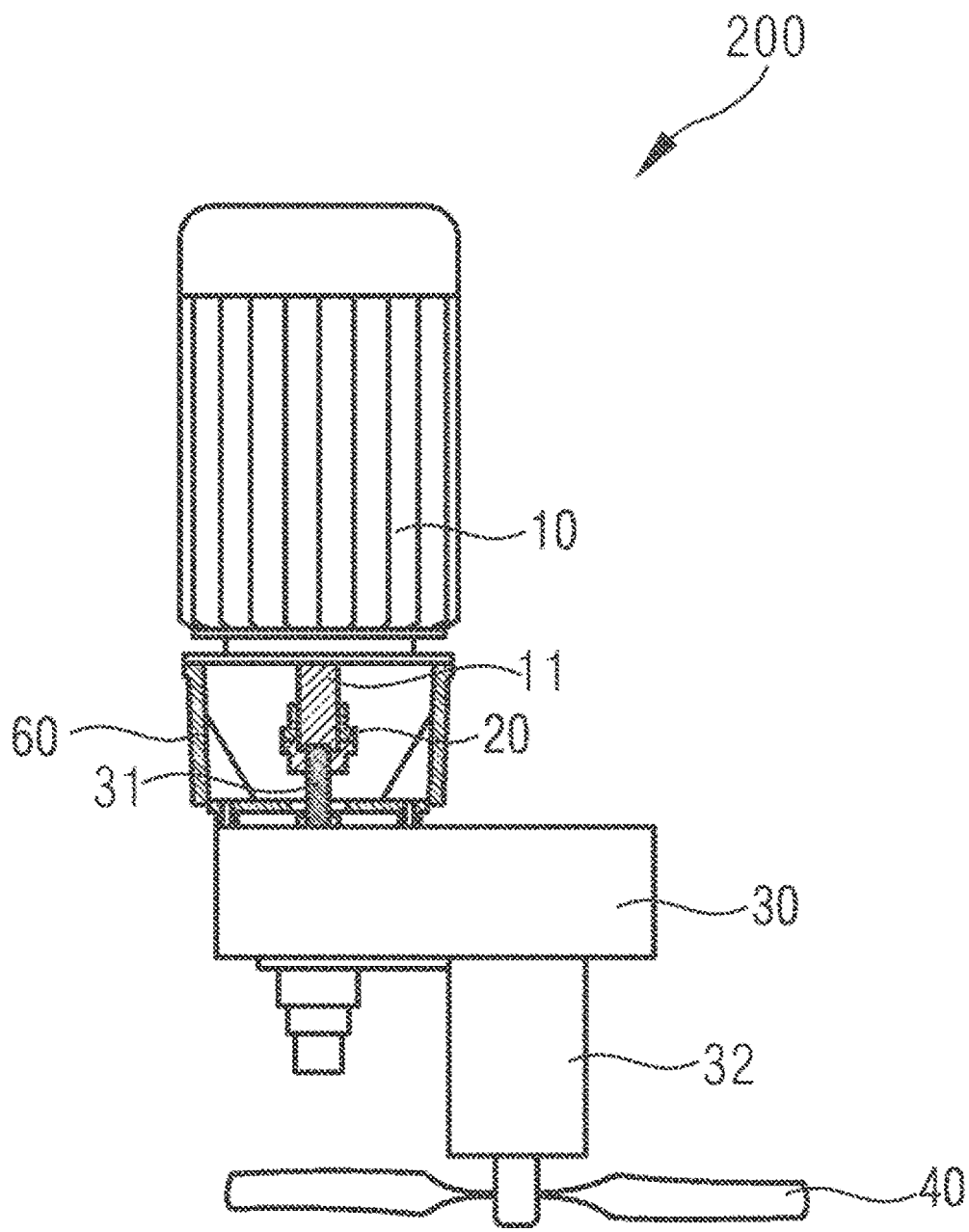
FIG. 1 shows a schematic diagram of a transmission device according to the prior art.

100; 200 transmission device
10 electric machine
11 electric machine output shaft
13 electric machine end cover
20 shaft coupler
30 speed reducer
31 speed reducer input shaft
32 speed reducer output shaft
33 speed reducer end cover
40 fan blade
41 bolt

DETAILED DESCRIPTION OF THE EXAMPLE EMBODIMENTS

At least one embodiment of the present application is directed to providing a transmission device, comprising:
an electric machine, wherein the electric machine comprises an electric machine output shaft; and
a speed reducer, comprising a speed reducer input shaft;
wherein the electric machine output shaft is directly connected to the speed reducer input shaft.

Using the manner of direct connection between the electric machine output shaft and the speed reducer input shaft enables the mounting length in the axial direction of the electric machine to be reduced, and mounting space to be saved. Moreover, such a manner of mounting enables a shaft coupling to be omitted, further saving costs.

According to an advantageous embodiment, a speed reducer end cover, located at the speed reducer input shaft, of the speed reducer is designed to be capable of being joined to an electric machine end cover at the electric machine output shaft of the electric machine, wherein the speed reducer end cover is connected to the electric machine end cover via a bolt. Due to the use of the manner of direct connection between the electric machine output shaft and the speed reducer input shaft, the axial mounting length is small when the electric machine is mounted vertically, and due to the omission of a shaft coupler, the strength of the direct butt-connection between the electric machine and the speed reducer is better; hence, an electric machine mounting flange can be omitted, and a manner of direct butt-connection between the electric machine end cover and the speed reducer end cover can be used. In order to realize the direct butt-connection between the electric machine end cover and the speed reducer end cover more effectively, the speed reducer end cover can be designed to be wider, so as to match the electric machine end cover.

According to an advantageous embodiment, the speed reducer input shaft is a solid shaft with an external spline provided thereon, and the electric machine output shaft is a hollow shaft with an internal spline provided therein, wherein the external spline and the internal spline can be fitted and connected together.

According to another advantageous embodiment, the speed reducer input shaft is a hollow shaft with an internal spline provided therein, and the electric machine output shaft is a solid shaft with an external spline provided thereon, wherein the external spline and the internal spline can be fitted and connected together.

By designing the electric machine output shaft and the speed reducer input shaft to be in splined connection, the rigidity of the direct connection therebetween can be improved.

According to another advantageous embodiment, the speed reducer input shaft and the electric machine output shaft are connected via a key.

According to another advantageous embodiment, the speed reducer input shaft and the electric machine output shaft are connected by an interference fit. Such an embodiment involves simpler processing, so can further reduce costs.

At least one embodiment of the present application is directed to providing an air-cooling island, comprising the transmission device as described in any one of the embodiments.

In order to enable a clearer understanding of the technical features, object and effects of the present application, particular embodiments of the present application are now explained with reference to the accompanying drawings.

FIG. 1 shows a schematic diagram of a transmission device 200 according to the prior art. The transmission device 200 according to the prior art comprises an electric machine 10 and a speed reducer 30. The electric machine 10 comprises an electric machine output shaft 11, for outputting motive power. The speed reducer 30 comprises a speed reducer input shaft 31, connectable to the electric machine output shaft 11; under the driving action of the electric machine output shaft 11, motive power is transmitted to the speed reducer output shaft 32, in turn driving fan blades 40, for the purpose of achieving the cooling of steam for example. As can be imagined, the speed reducer output shaft 32 may also be connected to another load.

To realize a connection between the electric machine output shaft 11 and the speed reducer input shaft 31, according to the prior art, a shaft coupler 20 is generally provided. The specific manner in which the shaft coupling is connected is prior art, and is not described again superfluously here. It is necessary to point out that when the transmission device 200 is used in an air-cooling island of a power plant for the purpose of driving fan blades, a vertical mounting position must often be adopted for the electric machine, due to the requirements regarding the arrangement positions of the electric machine 10, the speed reducer 30 and the fan blades 40, etc. When the shaft coupler 20 is used to establish a butt-connection between the electric machine output shaft 11 and the speed reducer input shaft 31, this often results in the transmission device having a long length in the axial direction of the electric machine, and an additional electric machine mounting flange 60 is also needed to support the electric machine 10 in the axial direction.

Figure 2:
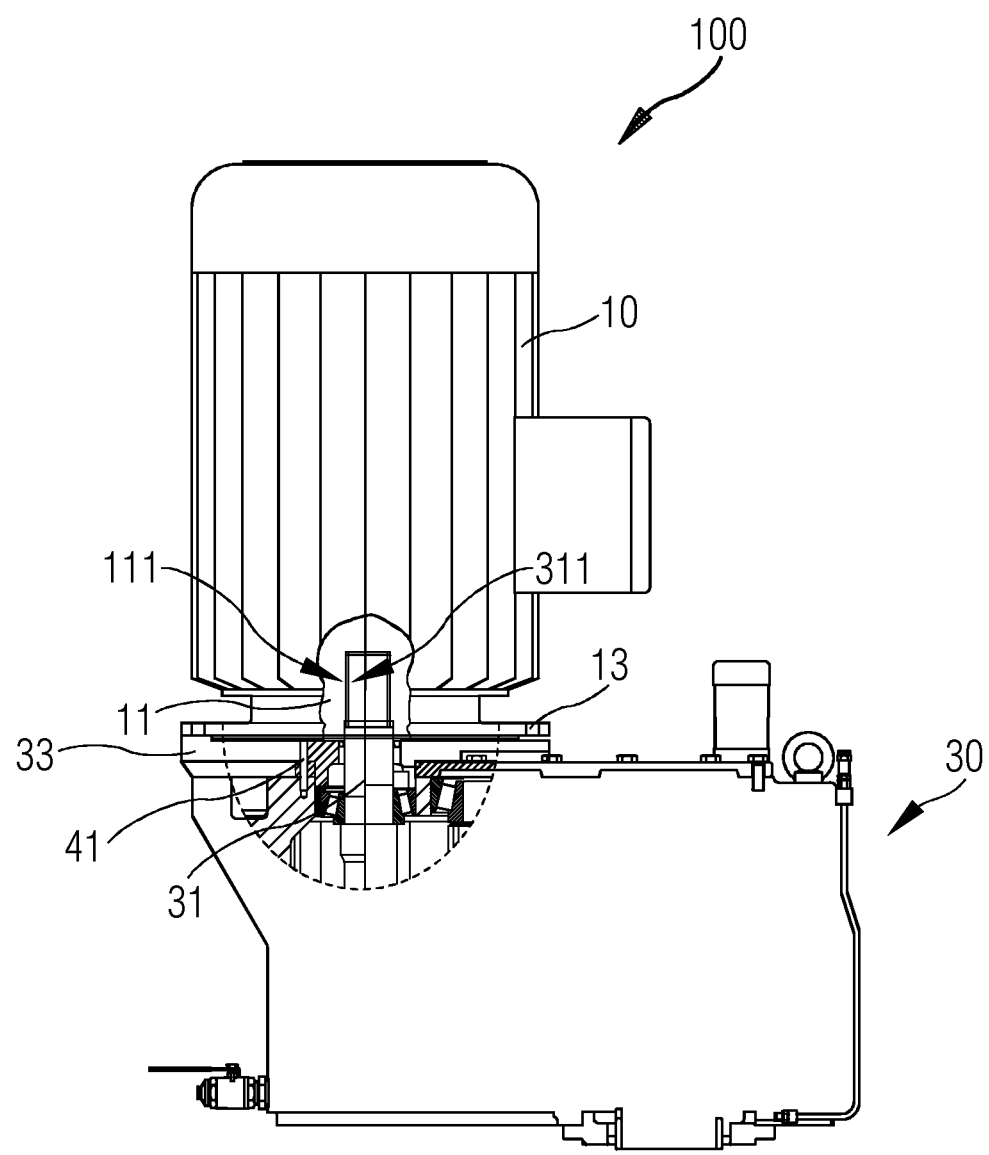
FIG. 2 shows a schematic diagram of a transmission device according to an embodiment of the present application.

In order to obtain a better mounting space, and at the same time reduce the number of components used for mounting, the present application provides a new manner of connection. As shown in FIG. 2, an electric machine mounting flange 60 is no longer provided between an electric machine 10 and a speed reducer 30. An electric machine output shaft 11 of the electric machine 10 and a speed reducer input shaft 31 are connected directly, thereby dispensing with the shaft coupler 20. As shown in the figure, the electric machine output shaft 11 and the speed reducer input shaft 31 are connected by splines. Specifically, the speed reducer input shaft 31 is a solid shaft with external splines 311 provided thereon, and the electric machine output shaft 11 is a hollow shaft with internal splines 111 provided therein, wherein the external splines 311 and the internal splines 111 can be fitted and connected together. Alternatively, the speed reducer input shaft 31 is a hollow shaft with internal splines provided therein, and the electric machine output shaft 11 is a solid shaft with external splines provided thereon, wherein the external splines and the internal splines can be fitted and connected together.

The fact that the electric machine output shaft 11 is directly connected to the speed reducer input shaft 31 results in a reduction in the mounting length in the axial direction of the electric machine, hence there is no need to use an electric machine mounting flange 60 to support the electric machine 10. Thus, correspondingly, a speed reducer end cover 33 at the speed reducer input shaft 31 of the speed reducer 30 is designed to have a larger diameter than a conventional end cover; this enables the speed reducer end cover and an electric machine end cover 13 at the electric machine output shaft 11 of the electric machine 10 to be joined to each other directly on end faces, wherein the speed reducer end cover 33 and the electric machine end cover 13 are connected to each other tightly via a bolt 41.

Although not shown specifically in the figures, in addition to the solution using a splined connection in the above embodiment, it is also possible for the speed reducer input shaft 31 and the electric machine output shaft 11 to be connected via a key. For example, the electric machine output shaft 11 may be designed as a hollow shaft, with the speed reducer input shaft 31 extending into the hollow shaft in a centered manner. Of course, it is also possible for the speed reducer input shaft 31 to be designed as a hollow shaft, with the electric machine output shaft 11 extending into the hollow shaft in a centered manner. A key is provided between the speed reducer input shaft 31 and the electric machine output shaft 11.

As another alternative, it is possible for the speed reducer input shaft 31 and the electric machine output shaft 11 to be connected simply by way of an interference fit. For example, the electric machine output shaft 11 may be designed as a hollow shaft, with the speed reducer input shaft 31 extending into the hollow shaft in a centered manner, and being connected to the hollow shaft by an interference fit. Of course, it is also possible for the speed reducer input shaft 31 to be designed as a hollow shaft, with the electric machine output shaft 11 extending into the hollow shaft in a centered manner.

Although no air-cooling island is shown herein, if a transmission system 100 as shown in an embodiment of the present application is provided in an air-cooling island, mounting space can be saved effectively, especially mounting space in a longitudinal direction; moreover, an electric machine mounting flange is dispensed with, thereby further saving costs.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the embodiments could also be suitably combined to form other embodiments capable of being understood by those skilled in the art.

The embodiments above are merely particular schematic embodiments of the present application, which are not intended to define the scope thereof. Equivalent changes, modifications and combinations made by any person skilled in the art without departing from the concept and principles of the present application should be included in the scope of protection of the present application.

The invention claimed is:
1. A transmission device, comprising:
an electric machine, including an electric machine output shaft; and
a speed reducer, including a speed reducer input shaft, wherein the electric machine output shaft is directly connected to the speed reducer input shaft, wherein
the speed reducer input shaft is a solid shaft, an external spline being provided on the speed reducer input shaft,
the electric machine output shaft is a hollow shaft, an internal spline being provided in the electric machine output shaft, and the external spline and the internal spline are fittable and connectable together.

2. The transmission device of claim 1, further comprising:
a speed reducer end cover of the speed reducer, located at the speed reducer input shaft, configured to be joinable to an electric machine end cover at the electric machine output shaft of the electric machine, wherein the speed reducer end cover is connected to the electric machine end cover via a bolt.

3. The transmission device of claim 2, wherein:
the speed reducer input shaft and the electric machine output shaft are connected by an interference fit.

* * * * *